US010841209B2

(12) United States Patent
Jain et al.

(10) Patent No.: US 10,841,209 B2
(45) Date of Patent: Nov. 17, 2020

(54) METHOD, NODE, AND MEDIUM FOR ESTABLISHING CONNECTION BETWEEN A SOURCE AND ENDPOINT VIA ONE OR MORE BORDER NODES

(71) Applicant: Cisco Technology, Inc., San Jose, CA (US)

(72) Inventors: Prakash Chand Jain, Fremont, CA (US); Sanjay Kumar Hooda, Pleasanton, CA (US); Victor M. Moreno, Carlsbad, CA (US); Satish Kumar Kondalam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 16/229,047

(22) Filed: Dec. 21, 2018

(65) Prior Publication Data

US 2020/0204483 A1 Jun. 25, 2020

(51) Int. Cl.
*H04L 12/725* (2013.01)
*H04L 12/713* (2013.01)
*H04L 12/927* (2013.01)
*H04L 12/715* (2013.01)

(52) U.S. Cl.
CPC .......... *H04L 45/302* (2013.01); *H04L 45/586* (2013.01); *H04L 45/64* (2013.01); *H04L 47/805* (2013.01)

(58) Field of Classification Search
CPC ... H04L 45/302; H04L 45/586; H04L 47/805; H04L 45/64
See application file for complete search history.

(56) References Cited

U.S. PATENT DOCUMENTS

| 5,925,137 | A * | 7/1999 | Okanoue ................ H04L 45/02 |
| | | | 709/239 |
| 9,294,393 | B1 * | 3/2016 | Mullooly ............... H04L 41/12 |
| 9,686,381 | B1 * | 6/2017 | Singh ..................... H04L 69/22 |
| 9,787,559 | B1 * | 10/2017 | Schroeder ........... H04L 41/5038 |
| 10,541,919 | B1 * | 1/2020 | Hooda ................. H04L 45/742 |
| 2003/0210705 | A1 * | 11/2003 | Seddigh ............... H04L 47/724 |
| | | | 370/419 |
| 2005/0195835 | A1 * | 9/2005 | Savage ................ H04L 45/125 |
| | | | 370/401 |

(Continued)

*Primary Examiner* — Omar J Ghowrwal
(74) *Attorney, Agent, or Firm* — Merchant & Gould P.C.

(57) ABSTRACT

In one embodiment, a method is performed at a node in a multi-site enterprise fabric. The method includes obtaining map entries from a fabric control plane of the multi-site enterprise fabric, where the map entries are associated with identifiers of endpoints in external networks, site and virtual network identifiers of sites in the multi-site enterprise fabric, location identifiers of border nodes, and characteristics of the border nodes. The method further includes receiving a request from a source to connect to an external endpoint. After deriving an external endpoint identifier and source parameters, the method additionally includes establishing at least one connection between the source and the external endpoint via border node(s) that are selected from the map entries based at least in part on the source parameters, the external endpoint identifier, and characteristics of the border node(s) with their site and virtual network identifier(s) along the at least one connection.

18 Claims, 9 Drawing Sheets

(56) References Cited

U.S. PATENT DOCUMENTS

| | | | |
|---|---|---|---|
| 2008/0049621 A1* | 2/2008 | McGuire | H04L 12/4645 370/236.2 |
| 2008/0130627 A1* | 6/2008 | Chen | H04L 47/22 370/351 |
| 2009/0249473 A1* | 10/2009 | Cohn | H04L 61/2007 726/15 |
| 2015/0163158 A1* | 6/2015 | Ryland | H04L 41/0893 709/225 |
| 2019/0052559 A1* | 2/2019 | Velayudhan | H04L 45/22 |
| 2019/0132292 A1* | 5/2019 | Reimer | H04L 63/0421 |
| 2019/0227998 A1* | 7/2019 | Wang | H04L 67/1097 |
| 2019/0288946 A1* | 9/2019 | Gupta | H04L 49/505 |
| 2019/0312809 A1* | 10/2019 | Hooda | H04L 45/54 |
| 2020/0045604 A1* | 2/2020 | Allan | H04W 36/32 |
| 2020/0119992 A1* | 4/2020 | Yan | H04L 43/16 |

* cited by examiner

METHOD, NODE, AND MEDIUM FOR ESTABLISHING CONNECTION BETWEEN A SOURCE AND ENDPOINT VIA ONE OR MORE BORDER NODES

TECHNICAL FIELD

The present disclosure relates generally to a computer network, and more particularly, to load balancing and steering of external traffic in multi-site enterprise fabric.

BACKGROUND

Locator/ID Separation Protocol (LISP) is a routing architecture that provides semantics for IP addressing. Traditional IP routing and addressing architecture uses a single numbering space, e.g., the IP address, to express two pieces of information: (a) a device identity; and (b) a device location. Using a single IP address to describe both what the device is (e.g., the device identity) and how the device is attached to the network (e.g., the device location), traditional IP routing and address architecture faces scalability issues. The LISP routing architecture offers the solution to the scalability issues by separating the device identity from its location. In LISP, the device identity is expressed as an endpoint identifier (EID), and the device location is identified by a routing locator (RLOC).

With improved scalability, it is desirable to use LISP in large scale networks, such as multi-site enterprise fabrics. Typically, a multi-site enterprise fabric spans across multiple service providers to connect geographically dispersed enterprise sites. Consequently, external traffic (e.g., traffic to the Internet) may exit the multi-site enterprise fabric via different service providers to reach external EIDs. Typically, the enterprise fabric relies on a LISP map server to direct traffic from these service providers using various types of LISP map messages.

Previously existing LISP map server and map message handling techniques are limited to destination EID and RLOCs within the same virtual network. In case of a multi-site enterprise fabric that has multiple borders adjacent multiple virtual networks, previously existing LISP techniques cannot register these border RLOCs with different path characteristics at the fabric control plane (e.g., Control Plane (CP) or Map-Server/Map-Resolver (MSMR)). Further, previously existing LISP techniques cannot reply to a map request for a destination EID with multiple border RLOCs in different virtual networks. As a result, previously existing LISP techniques have limited use in multi-site enterprise fabrics.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
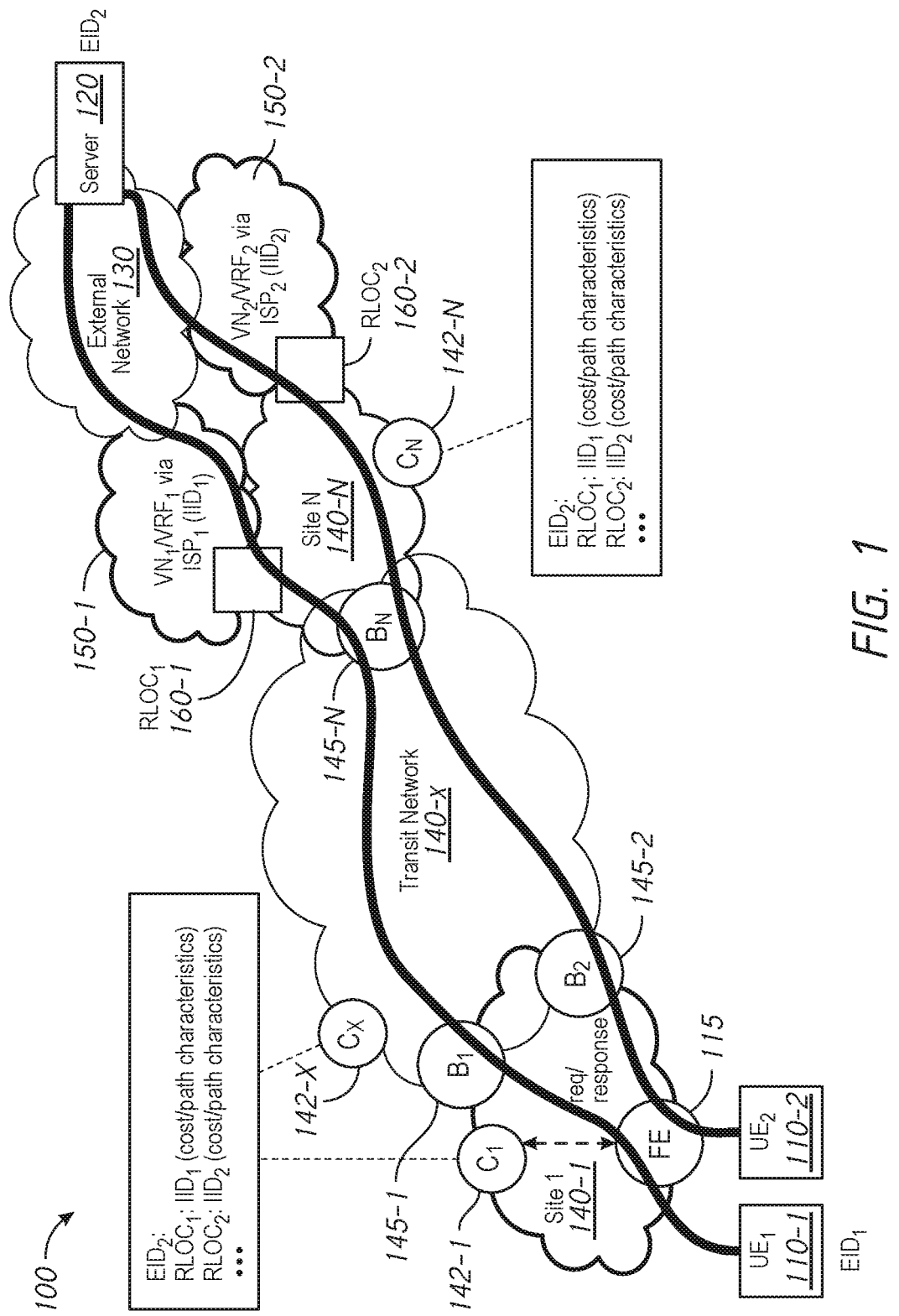
FIG. 1 illustrates an exemplary network with LISP as overlay of a multi-site enterprise fabric in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Systems and methods in accordance with embodiments described herein solve the aforementioned problems in a multi-site enterprise fabric with LISP overlay. In accordance with some embodiments, redundant/multiple borders (e.g., ingress/egress tunnel routers (xTRs) and/or RLOCs) are deployed in different virtual networks of the multi-site enterprise fabric. Flow for generating map-request and receiving reply at fabric edge remains the same as current LISP map-request and map-reply mechanisms but with additional parameters. Using the additional parameters, external traffic can be routed from the multi-site enterprise fabric to external non-fabric destinations (e.g., the Internet hosts and/or servers) via multiple RLOCs in different virtual networks with different path characteristics.

For instance, when a map-request is received by the fabric control plane from an xTR for an external destination/EID, a list of available external RLOCs would be provided with their cost/path characteristics and virtual network identifiers. The xTR connected to the source can then choose the best route to reach the external EID based on policies. In case a guest and an employee both request to reach the same external EID, based on user profiles and policies, traffic from the guest is routed through one service provider (e.g., ISP-A) and traffic from the employee is routed through a different service provider (e.g., ISP-B). In some instances, ISP-B provides faster and/or more secure access to the external EID. Thus, using the systems and methods described herein, the multi-site enterprise fabric can apply policy and load balancing across RLOCs in different virtual networks at the source based on source parameters (e.g., EID(s), group, Quality of Service (QoS) classification, flow identifiers, etc.). This results in a more robust and efficient multi-site enterprise fabric.

In accordance with various embodiments, a method is performed at a node in a multi-site enterprise fabric, where the node includes one or more processors and a non-transitory memory. The method includes obtaining map entries from a fabric control plane of the multi-site enterprise fabric, where the map entries are associated with identifiers of endpoints in external networks, site and virtual network identifiers of sites in the multi-site enterprise fabric, location identifiers of border nodes adjacent the sites, and characteristics of the border nodes. The method further includes receiving a request from a source to connect to an external endpoint. The method also includes deriving an identifier of the external endpoint and parameters associated with the source from the request. The method additionally includes establishing at least one connection between the source and the external endpoint via one or more border nodes, where the one or more border nodes are selected from the map entries based at least in part on the parameters associated with the source, the identifier of the external endpoint, and characteristics of the one or more border nodes along the at least one connection to the external endpoint.

EXAMPLE EMBODIMENTS

As explained above, conventional IP addressing uses a single address field for both identifying a device and determining where it is topologically located in the network. Thus, conventional addressing has scalability issues due to the attempts of optimization along two conflicting axes. Along the first axis, the address would be assigned topologically for routing to be efficient. Along the second axis, for collections of devices to be easily and effectively managed, the address would be assigned independently of the topology, e.g., without renumbering in response to topological change.

The approach that LISP takes to solving the routing scalability problem is to replace IP addresses with two new types of numbers. First, Routing Locators (RLOCs), which are topologically assigned to network attachment points (and are therefore amenable to aggregation) and used for routing and forwarding of packets through the network. Second, Endpoint Identifiers (EIDs), which are assigned independently from the network topology, are used for numbering devices, and are aggregated along administrative boundaries. LISP then defines functions for mapping between the two numbering spaces and for encapsulating traffic originated by devices using non-routable EIDs for transport across a network infrastructure that routes and forwards using RLOCs. Both RLOCs and EIDs are syntactically identical to IP addresses; it is the semantics of how they are used that differs.

FIG. 1 is an illustration of an exemplary network 100 with LISP as overlay of a multi-site enterprise fabric in accordance with some embodiments. The exemplary network 100 is one example of a suitable operating environment and is not intended to suggest any limitation as to the scope of use or functionality of the present disclosure. Thus, other environments and configurations can be employed without departing from the scope or spirit of the present disclosure.

In some embodiments, the exemplary network 100 includes a plurality of user equipment (UE) 110, e.g., $UE_1$ 110-1 and $UE_2$ 110-2. The UE 110 can be connected to a server 120 in an external network 130 (e.g., the Internet or a network outside the multi-site enterprise fabric) through a multi-site enterprise fabric with LISP as overlay. In some embodiments, a fabric edge device 115 at the edge of the multi-site enterprise fabric (also referred to as the "enterprise fabric" or the "fabric" hereinafter) connects the UE 110 to the multi-site enterprise fabric. When the UE 110 initiates a request to be connected to the server 120, the UE 110 is referred to as a "source" and traffic from the UE 110 to the server 120 in the external network 130 is referred to as "external traffic".

In some embodiments, the multi-site enterprise fabric includes multiple sites and/or networks 140, e.g., site 1 140-1, a transit network 140-x, and site N 140-N, etc. In some embodiments, each of the plurality of UEs 110 is assigned an endpoint identifier (EID) for numbering the device. For example, as shown in FIG. 1, $UE_1$ 110-1 is assigned $EID_1$ and the server 120 is numbered as $EID_2$. In some embodiments, the multi-site enterprise fabric also includes a plurality of border nodes 145 located along the borders of the sites and/or networks 130 to relay traffic. For example, border nodes $B_1$ 145-1 and $B_2$ 145-2 relay traffic between site 1 140-1 and the transit network 140-x, a border node $B_N$ 145-N relays traffic between the transit network 140-x and site N 140-N, a border node 160-1 relays traffic between a virtual network 150-1 and site N 140-N, and a border node 160-2 relays traffic between a virtual network 150-2 and site N 140-N. In the enterprise fabric, fabric edges (e.g., the fabric edge device 115) and border nodes (e.g., the border nodes 145) are also referred to as ingress/egress tunnel routers (xTRs). These xTRs route traffic from the UE 110 through the sites and/or networks 140, including the external traffic from the UE 110 to the server 120.

In some embodiments, when using LISP as overlay, the multiple sites and/or networks are deployed as multiple virtual networks (VNs) with Virtual Routing and Forwarding (VRFs). As is known in the art, VRF is a technology included in IP network routers that allows multiple instances of a routing table to exist in a router and work simultaneously. This increases network functionality by segmenting network paths without using multiple devices. In order to use VRF for segmentation, isolation, and security among network elements, VRFs are bound to instance identifiers (IDs) (IIDs) and these IIDs are included in the LISP header to provide traffic flow separation for single or multi-hop needs. Further, when using LISP as overlay, the border nodes are assigned RLOCs. As such, both "RLOC" and "border node" refer to a node hereinafter in the multi-site network implementing LISP, where the node routes and forwards packets across sites in the multi-site enterprise fabric.

For example, in the exemplary network 100, the sites and/or networks 140 can be deployed using $VN_1/VRF_1$ through $ISP_1$ 150-1 and $VN_2/VRF_2$ through $ISP_2$ 150-2. The border node 160-1 adjacent site N 140-N and $ISP_1$ 150-1 is associated with routing locator $RLOC_1$. In some embodiments, $VRF_1$ is bound to $IID_1$ for $VN_1$ and $VRF_2$ is bound to $IID_2$ for $VN_2$. Further, a routing locator $RLOC_2$ is assigned to the border node 160-2 adjacent site N 140-N and $ISP_2$ 150-2. As such, $RLOC_2$ and the border node 160-2 are used interchangeably to refer to the node 160-2 that routes and forwards packets between site N 140-N and $ISP_2$ 150-2.

In some embodiments, each of the sites and/or networks 140 has a fabric control plane (e.g., Control Plane (CP) or Map-Server/Map-Resolver (MSMR)) 142. For example, site 1 140-1 has fabric control plane $C_1$ 142-1, the transit network 140-x has fabric control plane $C_X$, and site N 140-N has fabric control plane $C_N$ for handling map requests and map replies. In some embodiments, LISP mappings are learned and/or configured, and then stored on each of the fabric control plane 142. In some embodiments, when the border nodes 160 associated with the RLOCs are provisioned, RLOCs along with the associated IIDs and cost/path characteristics are registered for $EID_2$ at the fabric control planes 142. Typically, LISP learned mappings for routing purposes are kept within same instance IID or VRF context, and are not shared across IIDs or VRFs. When two hosts (e.g., a subscriber and a provider) communicate to each other across the IIDs, LISP mappings are shared across the IIDs through existing mechanisms, such as Extranet or LISP VRF Leaking.

In some embodiments, the fabric control planes 142 further distributes the RLOC information to interested border nodes 145 and/or fabric edge devices 115. When $UE_1$ 110-1 contacts the fabric edge device 115 in order to connect to the server 120 in the external network 130, based on the policies and parameters associated with the source, e.g., $UE_1$ 110-1 is used by an employee of the enterprise and employees are assigned to faster and higher quality connections, the external traffic from $UE_1$ 110-1 to the server 120 is steered through the border nodes $B_1$ 145-1, $B_N$ 145-N, and $RLOC_1$ 160-1. On the other hand, when $UE_2$ 110-2 connects to the fabric edge 115 initiates a request to connect to the server 120, based on the policies and parameters associated with the source, e.g., $UE_2$ 110-2 is used by a guest of the enterprise and guests are assigned to a lower tiered network, etc., the external traffic from $UE_2$ 110-2 to the server 120 is steered through the border nodes $B_2$ 145-2, $B_N$ 145-N, and $RLOC_2$ 160-2.

Figure 2A:
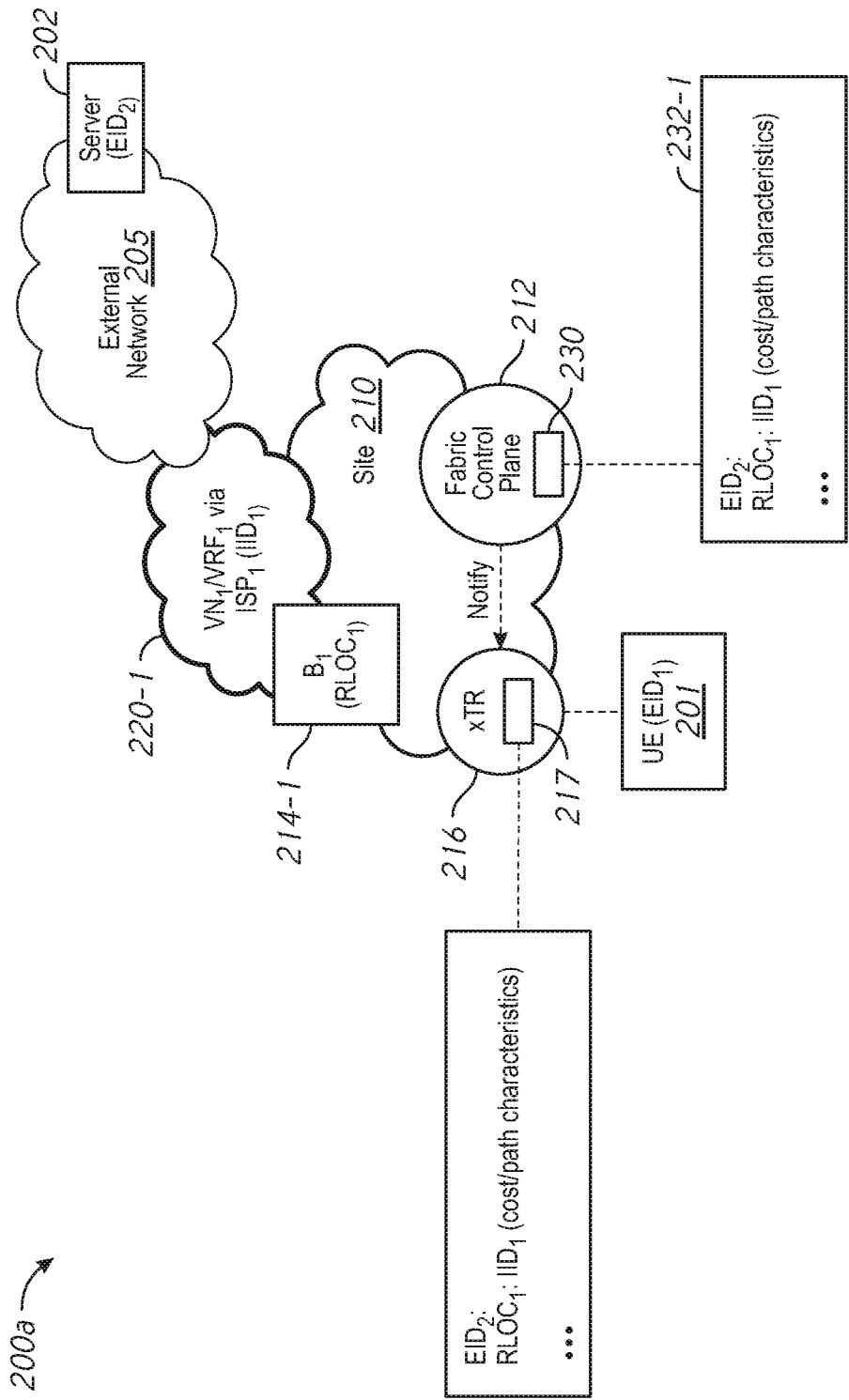
FIGS. 2A-2C illustrate generating and distributing map entries in a multi-site enterprise fabric in accordance with some embodiments.
Figure 2B:
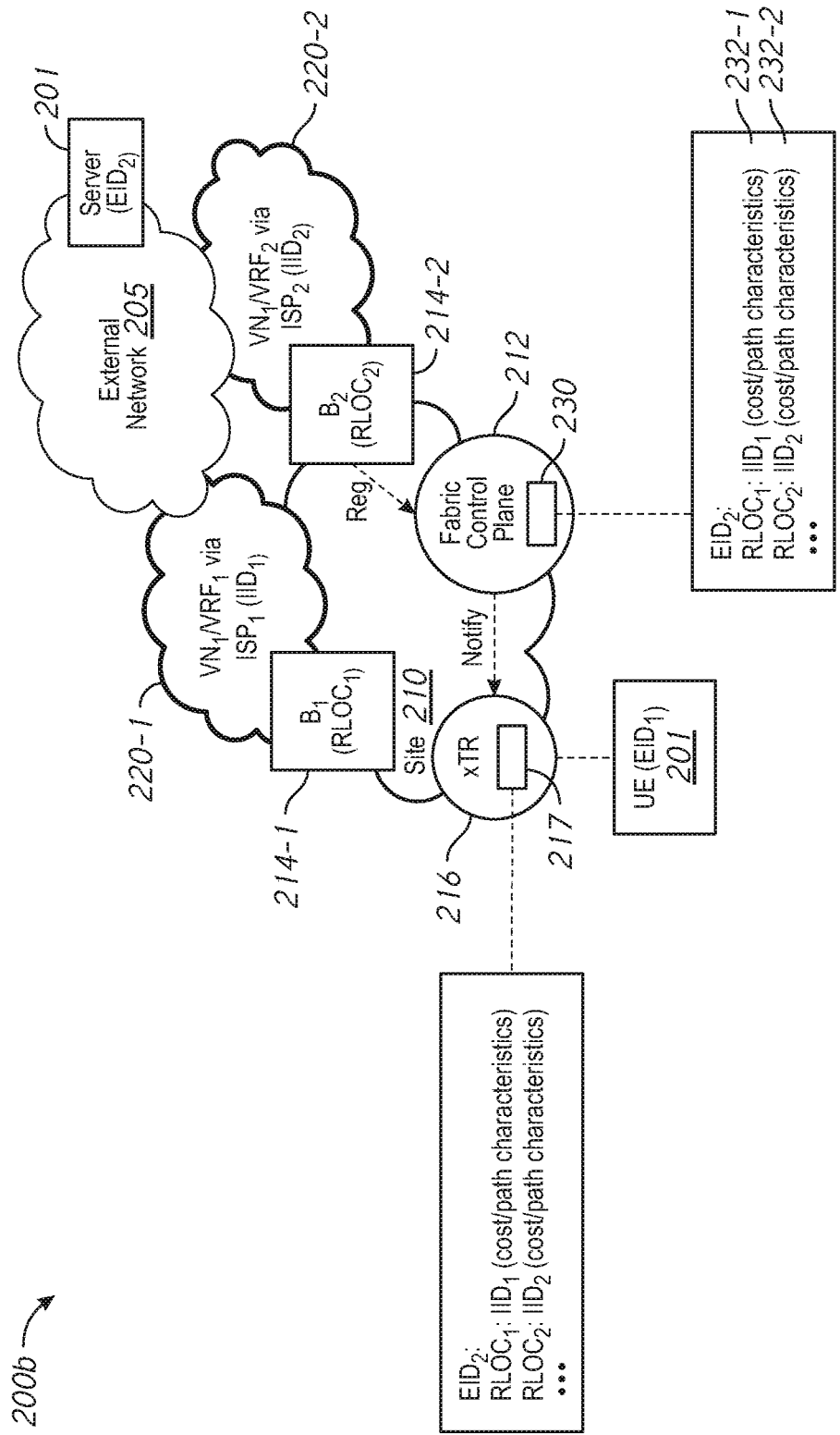
Figure 2C:
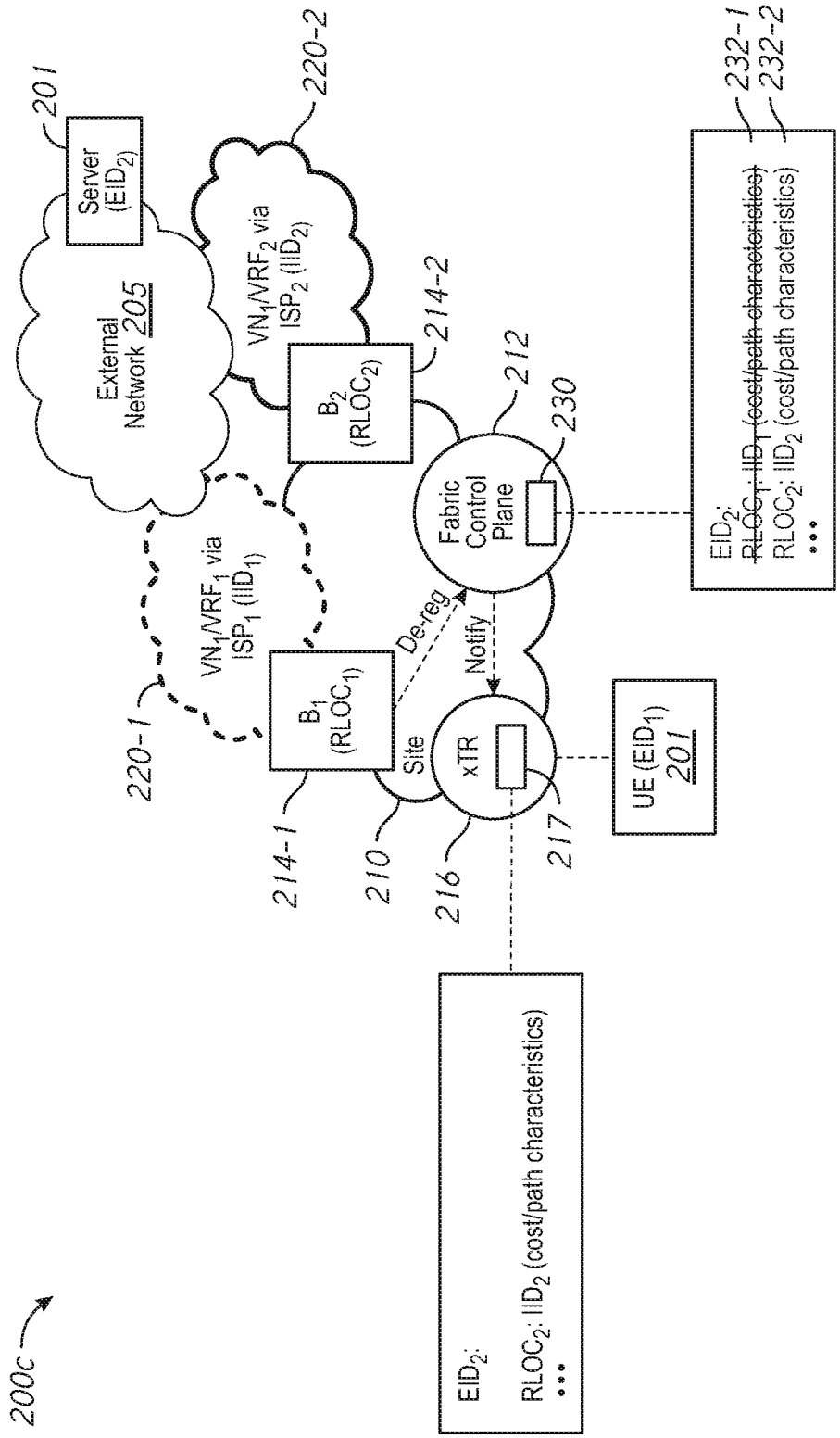

FIGS. 2A-2C illustrate generating and distributing map entries in a multi-site enterprise fabric in accordance with some embodiments. In particular, FIG. 2A illustrates policy-based provisioning map entry generation in an exemplary network environment 200A in accordance with some embodiments. In the exemplary network environment 200A, the multi-site enterprise fabric with LISP as overlay includes multiple sites and/or networks, e.g., a site 210 and a virtual network $VN_1/VRF_1$ via $ISP_1$ 220-1, etc. In some embodiments, each of the sites and/or networks includes a fabric control plane, one or more border nodes, and/or xTR(s). For example, the site 210 includes a fabric control plane 212, a border node $B_1$ 214-1 that corresponds to $RLOC_1$, and/or an xTR 216. These nodes in the multi-site enterprise fabric route external traffic from a UE 201 with an endpoint identifier $EID_1$ to a server 202 with an endpoint identifier $EID_2$.

In order to route the external traffic, the fabric control plane 212 obtains and maintains information about the border node(s) 214. In some embodiments, the fabric control plane 212 obtains such information by provisioning the border node(s), and configuring map entries 232 as a policy. For example, in FIG. 2A, a policy is configured on the fabric control plane 212 when provisioning the border node $B_1$ 214-1. In some embodiments, the policy is stored in a database 230 (also known as a map cache 230) on the fabric control plane 212. In some embodiments, the database 230 includes one or more map entries 232 for routing. For instance, in FIG. 2A, one of the entries included in the database 230 is a map entry 232-1 for the server 202 with the identifier $EID_2$. The map entry 232-1 specifies that the border node $B_1$ 214-1 corresponding to $RLOC_1$ can route traffic to the server 202 with the identifier $EID_2$. The map entry 232-1 further specifies that the routing to the server 202 via the border node $B_1$ 214-1 is through $VN_1/VRF_1$ 220-1 bounded to $IID_1$. Additionally, the map entry 232-1 specifies the cost/path characteristics of the route (also known as the path, the tunnel, or the connection) through $VN_1/VRF_1/IID_1$ 220-1 to the server 202.

In some embodiments, the fabric control plane 212 distributes the map entries 232 to interested nodes, e.g., the xTR 216 for routing. In some embodiments, the fabric control plane 212 notifies the xTR 216 using existing mechanisms, such as LISP map notify or LISP publish/subscribe. In some embodiments, during forwarding lookups, the map entries 232 stored in the map cache 230 are passed to forwarding layer and installed at various stages of the forwarding pipe line (e.g., L2/L3 entry, policy, load balancing logic, and/or rewrite, etc.). The forwarding pipeline can apply policy to balance the traffic load across multiple RLOCs and VNs/VRFs at the xTR 216 close to the source 201. For instance, in FIG. 2A, the xTR 216 includes a map cache 217 for storing the received map entries. The map entries represent a list of available border nodes along with their corresponding RLOCs and cost/path characteristics to $EID_2$. When the UE 201 attempts to connect to the server 202 corresponding to $EID_2$, the xTR 216 can locate the RLOC(s) associated with $EID_2$. In case there are multiple RLOCs associated with the same EID, the xTR 216 can choose the best RLOC from the list of entries based at least in part on the associated cost/path characteristics.

FIG. 2B illustrates an exemplary network environment 200B with dynamic map entry generation and updates in accordance with some embodiments. The exemplary network environment 200B shown in FIG. 2B is similar to and adapted from the exemplary network environment 200A shown in FIG. 2A. Elements common to FIGS. 2A and 2B include common reference numbers, and the differences between FIGS. 2A and 2B are described herein for the sake of brevity. To that end, relative to the exemplary network environment 200A, the exemplary network 200B includes an additional virtual network $VN_2/VRF_2$ 220-2 via $ISP_2$ that is bound by LISP to $IID_2$. Further, the network 200B includes a border node $B_2$ 214-2 adjacent the site 210 and $VN_2/VRF_2$ 220-2.

In some embodiments, when $VN_2/VRF_2$ 220-2 is up, the border node $B_2$ 214-2 adjacent $VN_2/VRF_2$ 220-2 and the site 210 registers with the fabric control plane 212, e.g., by sending a LISP map register message as indicated by the dotted arrow. In some embodiments, the LISP map register message includes information about the border node $B_2$ 214-2, e.g., the RLOC assigned to the border node $B_2$ 214-2 and/or the cost/path characteristics of the border node $B_2$ 214-2 to the external server 202 via $VN_2/VRF_2$ 220-2, etc. One embodiment of using the LISP map register message for conveying the information about RLOC is described below with reference to FIG. 3.

Upon receiving the LISP map register message, the fabric control plane 212 generates and/or updates the map cache 230, e.g., by including a map entry 232-2 for the border node $B_2$ 214-2. In the exemplary network 200B, the map entry 232-2 specifies that in addition to the border node $B_1$ 214-1, the border node $B_2$ 214-2 corresponding to $RLOC_2$ can also route traffic to the server 202 with the identifier $EID_2$. The map entry 232-2 further specifies that the routing to the server 202 via the border node $B_2$ 214-2 is through $VN_2/VRF_2$ 220-2 bounded to $IID_1$. The map entry 232-2 also specifies the cost/path characteristics of the route through $VN_2/VRF_2/IID_2$ 220-2 to the server 202.

In some embodiments, the fabric control plane 212 distributes the updated map entries 232 to interested nodes (e.g., the xTR 216). In some embodiments, as explained above with reference to FIG. 2A, the fabric control plane 212 notifies the xTR 216 using existing mechanisms, such as LISP map notify or LISP publish/subscribe. One embodiment of using a LISP map notify message for distributing the information about the border node(s) is described below with reference to FIG. 5.

Upon receiving the updated map entries, the xTR 216 updates the information in its map cache 217. As shown in FIG. 2B, the updated map entries stored in the map cache 217 indicate there are multiple available RLOCs with cost/path characteristics and VNs/VRFs/IIDs for connections to the server 202 associated with $EID_2$. When the UE 201 attempts to connect to the server 202, the xTR 216 can choose among these RLOCs associated with different sites based on the characteristics of the RLOCs. Further, using the map entries, the multi-site enterprise fabric can also switch to a different border node in a different virtual network due to connectivity issues or for load balancing purposes.

FIG. 2C illustrates an exemplary network environment 200C with dynamic map entry de-registration in accordance with some embodiments. The exemplary network environment 200C shown in FIG. 2C is similar to and adapted from the exemplary network environment 200B shown in FIG. 2B. Elements common to FIGS. 2B and 2C include common reference numbers, and the differences between FIGS. 2B and 2C are described herein for the sake of brevity. To that end, relative to the exemplary network environment 200B, in the exemplary network 200C, the virtual network $VN_1$/$VRF_1$ 220-1 via $ISP_1$ is no long available to route traffic to the external network 205, as indicated by the dotted border.

In some embodiments, when $VN_1$/$VRF_1$ 220-1 becomes unavailable, the border node $B_1$ 214-1 adjacent $VN_1$/$VRF_1$ 220-1 and the site 210 detects reachability issues to the external network 205 via $VN_1$/$VRF_1$ 220-1. In some embodiments, reachability issues to the external network 205 are detected at the border node $B_1$ 214-1 using existing mechanisms, such as link or connectivity failure detection using loss/delay/performance parameters conveyed by Ethernet Operations, Administration, and Maintenance (OAM) protocol, etc. As is known in the art, OAM is a protocol for installing, monitoring, and troubleshooting networks to increase management capability within the context of the overall network infrastructure.

In some embodiments, upon detecting the reachability issues, the border node $B_1$ 214-1 calculates the cost/path characteristics and informs the updated cost/path characteristics to the fabric control plane 212, as indicated by the dotted arrow. In some embodiments, the communication is carried out by exchanging LISP map request and/or LISP map reply message(s). One embodiment of using the LISP map reply message for distributing information about the border node(s) is described below with reference to FIG. 4.

In some embodiments, the LISP map reply message includes information about the border node $B_2$ 214-2, including an indication of its reachability issues. Upon receiving the LISP map reply message, the fabric control plane 212 de-registers the map entries 232-1 corresponding to the border node $B_1$ 214-1, e.g., by marking in the map entries database 230 that the entry 232-1 corresponding to the border node $B_1$ 214-1 has reachability issues. Further, the fabric control plane 212 distributes the updated map entries 230 to interested nodes, e.g., the xTR 216 for routing as indicated by the dotted arrow. As described above with reference to FIG. 2B, upon receiving the updated map entries, the xTR 216 updates information in its map cache 217. In FIG. 2C, the xTR 216 marks the map entry of $RLOC_1$ corresponding to the border node $B_1$ 214-1 as having reachability issues. Accordingly, in case the UE 201 was connected to the server 202 through the border node $B_1$ 214-1, the xTR 216 can seamlessly establish a new connection through a different border node in a different virtual network, e.g., through the border node $B_2$ 214-2 corresponding to $RLOC_2$ adjacent the site 210 and $VN_2$/$VRF_2$/$IID_2$ 220-2 via $ISP_2$.

Thus, in accordance with embodiments described herein, changes in the RLOCs, including their cost/path characteristics and the associated VNs/VRFs/IIDs, are sent from the border nodes 214 to the fabric control plane 212 and then from the fabric control plane 212 to fabric edge devices (e.g., the xTR 216). Upon receiving the up-to-date information, the fabric edge devices (e.g., the xTR 216) close to the source would update the map entries in the map cache (e.g., the map cache 217) and use the up-to-date information as their forwarding policy and for load balancing.

Figure 3:
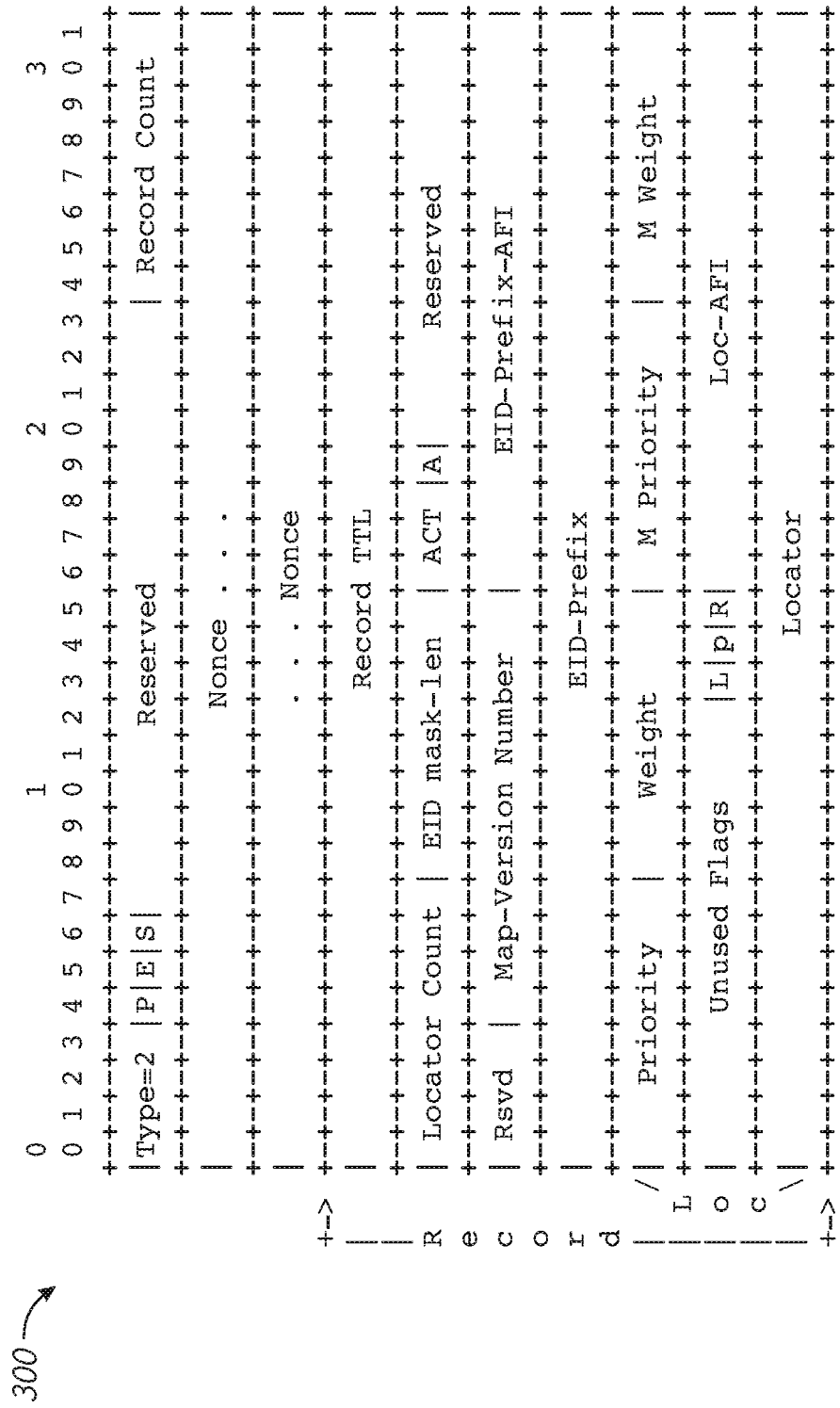
FIG. 3 illustrates an exemplary format of a LISP map register message in accordance with some embodiments.

FIG. 3 illustrates an exemplary format of a LISP map register message 300 in accordance with some embodiments. Internet Engineering Task Force RFC 6830 ("The Locator/ID Separation Protocol (LISP)," Farinacci et al., January 2013, hereinafter "RFC 6830") describes LISP protocol and formats of LISP map messages. Pursuant to RFC 6830, the type field with a value of 2 indicates that the message is a LISP map register message. In some embodiments, a LISP map register message with the EID-Prefix field encoded as 0 (e.g., 0.0.0.0) indicates that the packet is a LISP map register message for an external EID, e.g., the server 120 in the external network 130 (FIG. 1) and/or the server 201 in the external network 205 (FIGS. 2A-2C). Pursuant to RFC 6830, the ACT field as shown in FIG. 3 is a 3-bit field describing Negative Map-Reply (NMR) actions. In some embodiments, currently unused ACT value(s) can be used to indicate external EID forwarding, e.g., the actions to be performed on the fabric control plane. In some embodiments, the LISP map register message for the external EID can also carry additional information about the forwarder node (e.g., the border nodes 160 in FIG. 1 and/or the border nodes 214 in FIG. 2), such as the cost/path characteristics, performance matrix, and/or resource availability, etc. In some embodiments, the LISP map register messages with private LISP Canonical Address Format (LCAF) type can be used for this purpose.

Figure 4:
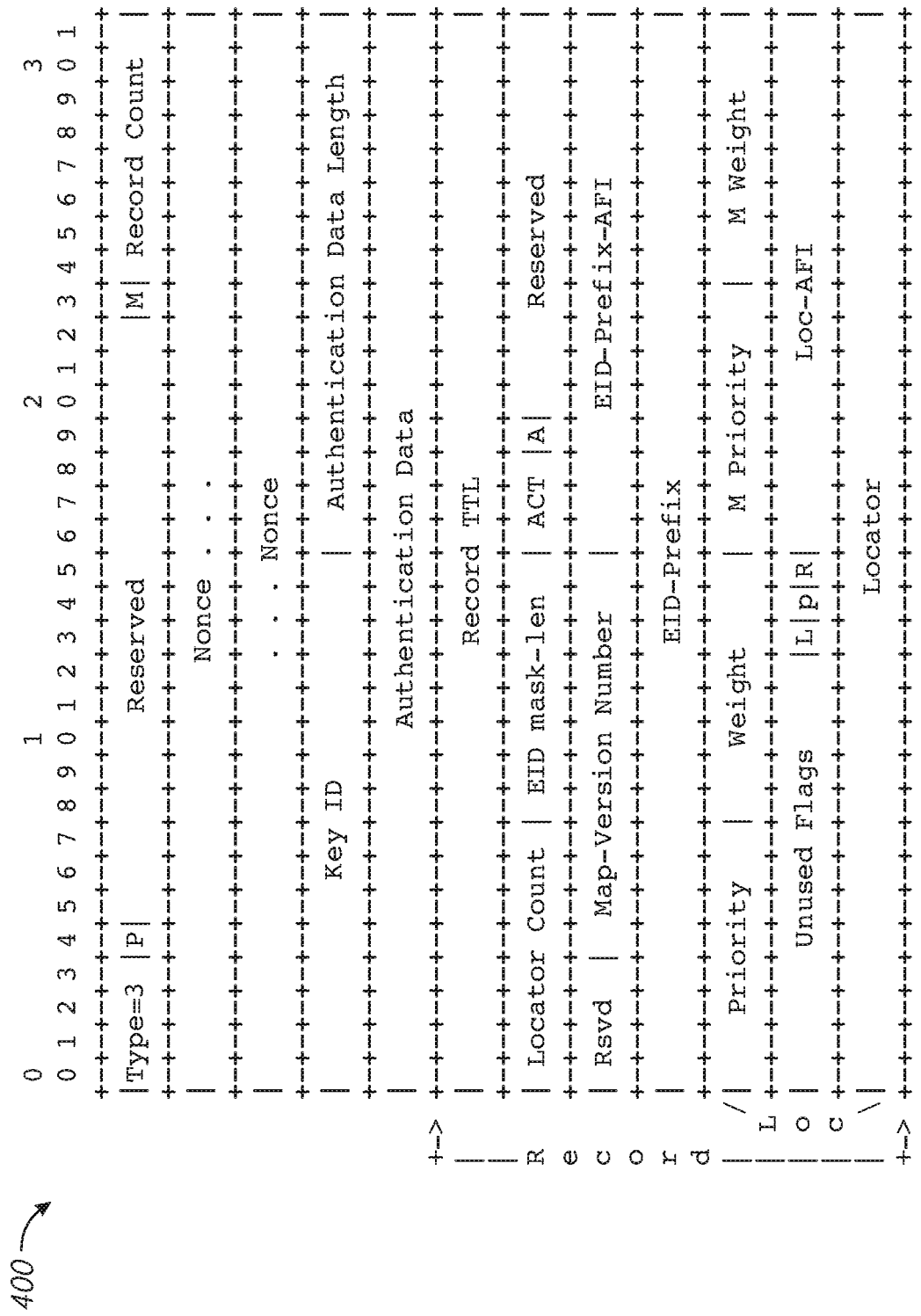
FIG. 4 illustrates an exemplary format of a LISP map reply message in accordance with some embodiments.

FIG. 4 illustrates an exemplary format of a LISP map reply message 400 in accordance with some embodiments. Pursuant to RFC 6830, the type field with a value of 3 indicates that the message is a LISP map reply message. In some embodiments, in the EID-Prefix field, a LISP map reply message encodes the EID as a LISP negative map-reply (NMR) prefix calculated by the fabric control plane. As is known in the art, the NMR prefix indicates that the EID is from an external network (e.g., a non-LISP site). In some embodiments, currently unused ACT value(s) can be used to indicate external EID forwarding, e.g., carrying the actions to be performed on the external EID RLOC mappings at an xTR. In some embodiments, the LISP map reply message for the external EID can also carry additional information from the fabric control plane (e.g., the fabric edge 115 in FIG. 1 and/or the xTR 216 in FIGS. 2A-2C), such as whether the mapping is created based on policy (e.g., as shown in FIG. 2A) or based on dynamic registration (e.g., as shown in FIGS. 2B and 2C). Also, through the LISP map reply message, the fabric control plane (e.g., the fabric edge 115 in FIG. 1 and/or the xTR 216 in FIGS. 2A-2C) can communicate to the xTR whether or not a local policy can be applied on the mappings. In some embodiments, the LISP map reply messages with private LCAF type can be used for this purpose.

Figure 5:
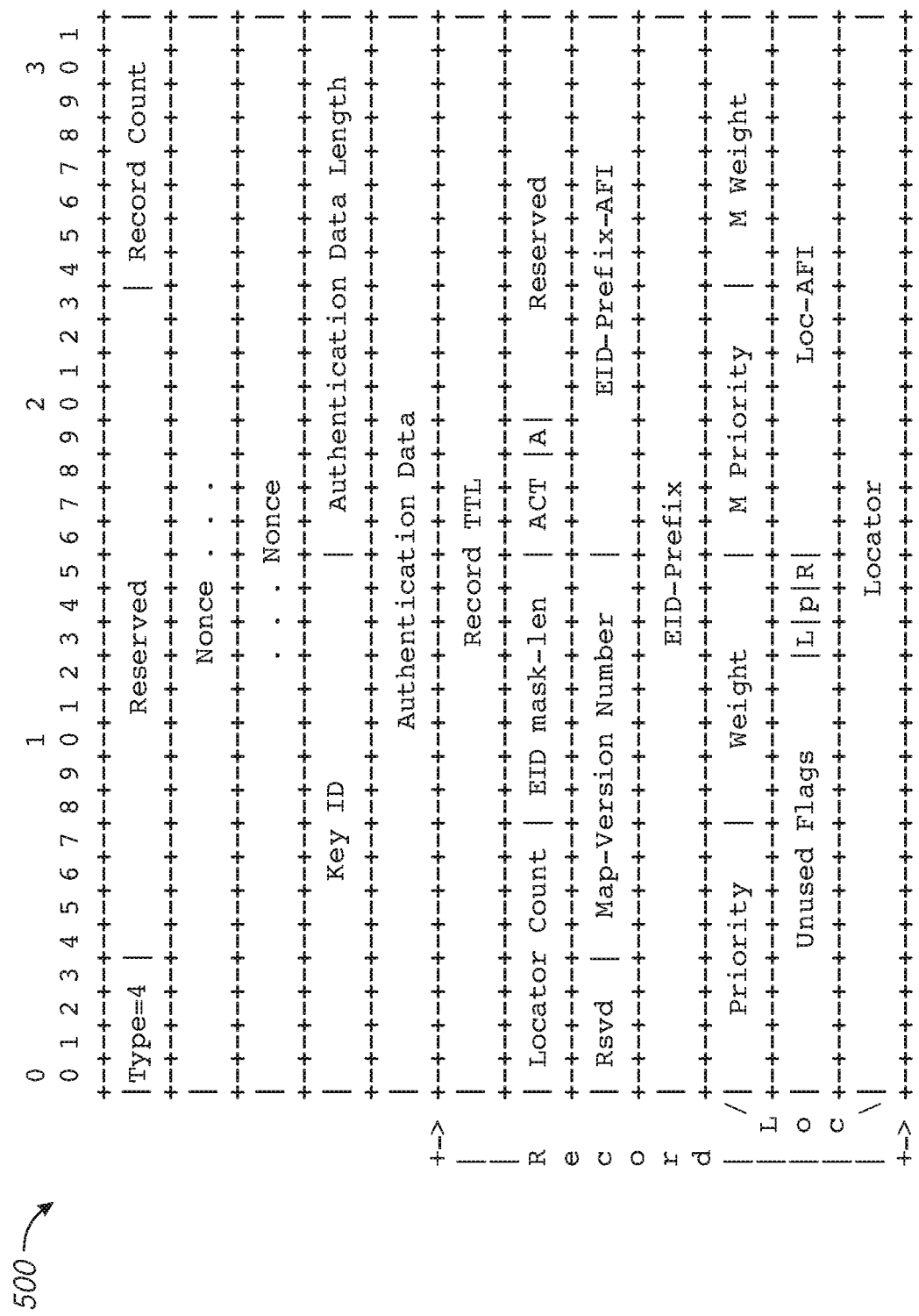
FIG. 5 illustrates an exemplary format of a LISP map notify message in accordance with some embodiments.

FIG. 5 illustrates an exemplary format of a LISP map notify message 500 in accordance with some embodiments.

Pursuant to RFC 6830, the type field with a value of 4 indicates that the message is a LISP map notify message. In some embodiments, a LISP map notify message with the EID-Prefix field encoded as 0 (e.g., 0.0.0.0) indicates it is a LISP map notify message for an external EID, e.g., the server 120 in the external network 130 (FIG. 1) and/or the server 202 in the external network 205 (FIGS. 2A-2C). In some embodiments, currently unused ACT value(s) can be used to indicate external EID forwarding, e.g., carrying the actions to be performed on the fabric control plane. In some embodiments, the LISP map notify message for the external EID can also carry additional information about the forwarder node (e.g., the border nodes 160 in FIG. 1 and/or the border nodes 214 in FIG. 2), such as the cost/path characteristics, performance matrix, and/or resource availability, etc. In some embodiments, the LISP map notify messages with private LISP Canonical Address Format (LCAF) type can be used for this purpose.

Using the information derived from the LISP map register message 300, the LISP map reply message 400, and/or the LISP map notify message 500, the fabric control plane (e.g., the fabric control plane 142 in FIG. 1 and/or the fabric control plane 212 in FIGS. 2A-2C) and the fabric edge (e.g., the fabric edge device 115 in FIG. 1 and/or the xTR 216 in FIGS. 2A-2C) can choose from multiple border nodes in multiple sites to establish a tunnel connecting two endpoint devices. It should be noted that FIGS. 3-5 are examples of suitable packet formats and are not intended to suggest any limitation as to the scope of use or functionality of the present disclosure. Thus, other formats and configurations can be employed without departing from the scope or spirit of the present disclosure.

Figure 6:
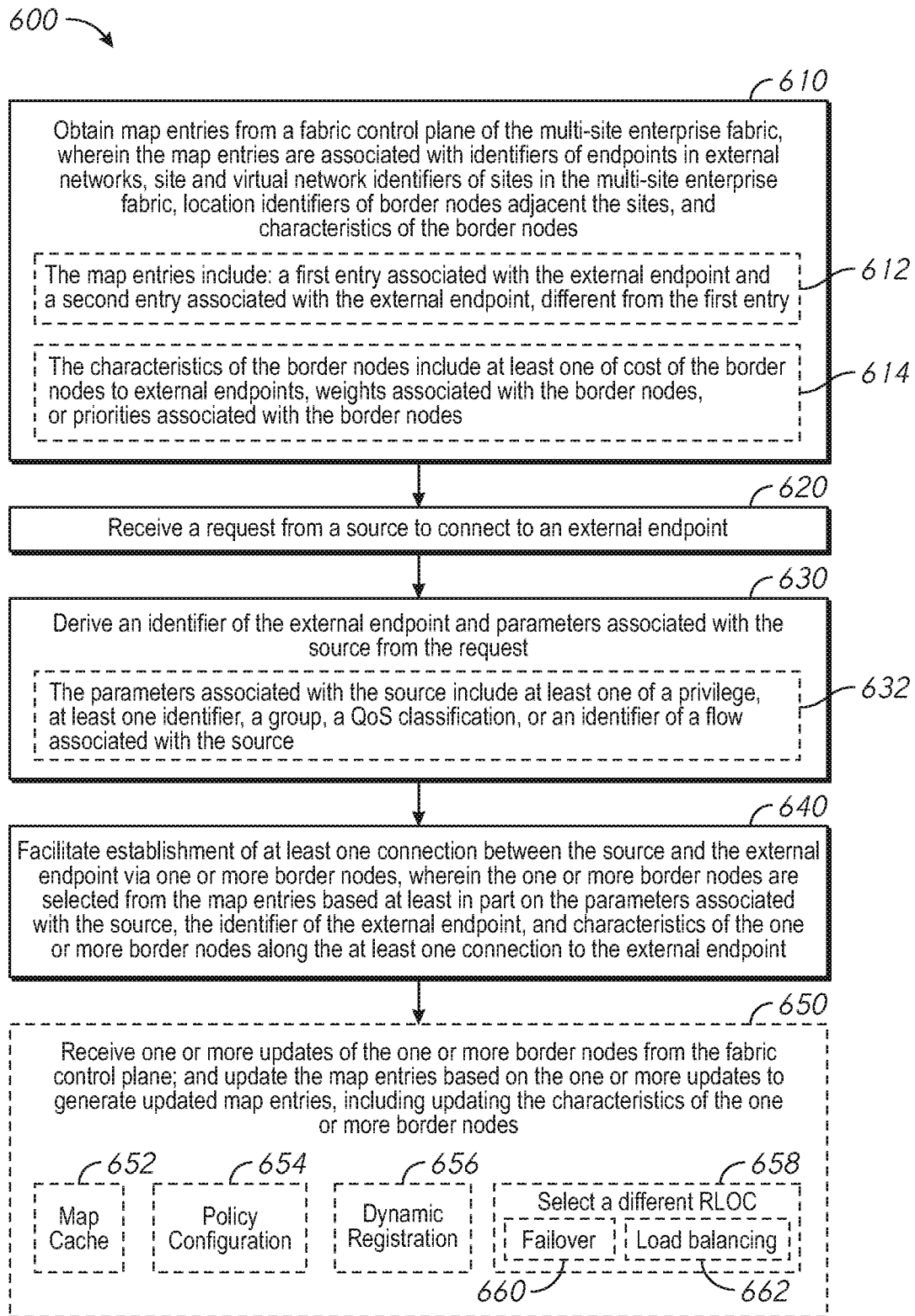
FIG. 6 is a flowchart illustrating a method of source-driven selective load balancing and steering of external traffic in a multi-site enterprise fabric network in accordance with some embodiments.

FIG. 6 is a flowchart illustrating a method 600 of source-driven selective load balancing and steering of external traffic in a multi-site enterprise fabric network in accordance with some embodiments. In some embodiments, the method 600 is performed at a node in a multi-site enterprise fabric, e.g., the fabric edge device 115 connected to the source (e.g., the UE 110) in the multi-site enterprise fabric shown in FIG. 1 and/or the xTR 216 connected to the source (e.g., the UE 201) in the multi-site enterprise fabric shown in FIGS. 2A-2C. In some embodiments, the node includes one or more processors and a non-transitory memory. In some embodiments, the method 600 is performed by processing logic, including hardware, firmware, software, or a combination thereof. In some embodiments, the method 600 is performed by one or more processors, one or more controllers, and/or one or more circuitries executing codes stored in a non-transitory computer-readable medium (e.g., a non-transitory memory).

The method 600 includes, as represented by block 610, obtaining map entries from a fabric control plane of the multi-site enterprise fabric. In some embodiments, the map entries are associated with identifiers of endpoints in external networks, site and virtual network identifiers of sites in the multi-site enterprise fabric, location identifiers of border nodes adjacent the sites, and characteristics of the border nodes. In some embodiments, as represented by block 612, the map entries include at least two entries associated with the same external endpoint. For instance, the map entries can include a first entry associated with the external point, where the first entry represents an association of a first border node adjacent a first site with the first site and a cost of the first border node to the external endpoint through the first site. In addition, the map entries can also include a second entry associated with the external endpoint, where the second entry is different from the first entry and represents an association of a second border node adjacent a second site with the second site and a cost of the second border node to the external endpoint through the second site. In some embodiments, as represented by block 614, the characteristics of the border nodes include at least one of costs of the border nodes to the external endpoints, weights associated with the border nodes to the external endpoint, or priorities associated with the border nodes.

For instance, in FIG. 1, the fabric edge device 115 requests the map entries stored in the map cache on the fabric control plane 142 and obtains the map entries from the fabric control plane 142. As shown in FIG. 1, the obtained map entries include multiple entries for the same external endpoint, e.g., the server 120 in the external network 130 associated with the endpoint device identifier $EID_2$. Each of the entries specify a respective border node 160 capable of routing traffic to the server 120 via a respective site 140 and the corresponding characteristics of the respective border node 160 (e.g., the cost/path characteristics of the respective border node 160 to route the traffic to the server 120 via the respective site 140 in FIG. 1). Further as shown in FIG. 1, the sites 150 are assigned site and virtual network identifiers. For example, the site 150-1, which is configured as the virtual network $VN_1$ with $VRF_1$ via $ISP_1$, is assigned the site and virtual network identifier $IID_1$; and the site 150-2, which is configured as the virtual network $VN_2$ with $VRF_2$ via $ISP_2$, is assigned the site and virtual network identifier $IID_2$.

The method 600 continues, as represented by block 620, with the node receiving a request from a source to connect to an external endpoint. The method 600 further includes, as represented by block 630, deriving an identifier of the external endpoint and parameters associated with the source from the request. In some embodiments, as represented by block 632, the parameters associated with the source include at least one of a privilege, at least one identifier (e.g., IID associate with a flow and/or EID), a group, a QoS classification, or an identifier of a flow associated with the source. For instance, in FIG. 1, when the fabric edge device 115 receives a request from a source, (e.g., the UE 110) to connect to the server 120, the fabric edge device 115 derives from the request the identifier of the server 120 as $EID_2$ and parameters associated with the source 110. The parameters can include, e.g., whether $UE_1$ 110-1 is used by an employee of the enterprise or a guest of the enterprise, the endpoint identifier $EID_1$ associated with $UE_1$ 110-1, the group the $UE_1$ 110-1 belongs to, an IID associated with the flow from the source, requirements of the flow including QoS classification, etc.

The method continues, as represented by block 640, with the node facilitating establishment of at least one connection between the source and the external endpoint via one or more border nodes. In some embodiments, the one or more border nodes are selected from the map entries based at least in part on the parameters associated with the source, the identifier of the external endpoint, and characteristics of the one or more border nodes along the at least one connection to the external endpoint.

For instance, in FIG. 1, the bold lines represent tunnels connecting the UE 110 to the server 120. The fabric edge device 115 facilitates the establishment of the tunnels by choosing the border nodes along the path. The fabric edge device 115 selects the border nodes 160 for the tunnels from the map entries. In some embodiments, the selection of the border nodes 160 is based least in part on the information derived from the request (e.g., $EID_2$ associated with the server 120, privileges, group, QoS classification, etc. of the UE 110) and the information in the map entries (e.g., the cost/path characteristics of the RLOCs), etc. As a result, the tunnel connecting the $UE_1$ 110-1 to the server 120 includes the fabric edge device 115 and the border nodes $B_1$ 145-1, $B_N$ 145-1, and $RLOC_1$ 160-1 through the site configured as $VN_1/VRF_1/IID_1$ via $ISP_1$ 150-1. The tunnel connecting the $UE_2$ 110-2 to the server 120 includes the fabric edge device 115 and the border nodes $B_2$ 145-2, $B_N$ 145-1, and $RLOC_2$ 160-2 through the site configured as $VN_2/VRF_2/IID_2$ via $ISP_2$ 150-1.

In some embodiments, as represented by block 650, the method 600 further includes receiving one or more updates of the one or more border nodes from the fabric control plane, and updating the map entries based on the one or more updates to generate updated map entries, including updating the characteristics of the one or more border nodes to the external endpoint. In such embodiments, as represented by block 652, the method 600 further includes storing the map entries in a map cache, and updating the map entries in the map cache based on the one or more updates in accordance with some embodiments. Also, in such embodiments, as represented by block 654, the one or more updates are generated based on configurations of the border nodes during provisioning in accordance with some embodiments. Additionally, in such embodiments, as represented by block 656, the one or more updates are generated in accordance with the fabric control plane receiving updates from at least one border node of the border nodes in accordance with some embodiments. Further, in such embodiments, as represented by block 658, when the at least one connection between the source and the external endpoint includes a first node, the method 600 further includes selecting a second node from the updated map entries, and modifying the at least one connection between the source to the external endpoint to include the second node in accordance with some embodiments.

For instance, as shown in FIG. 2A-2C, the fabric control plane 212 maintains its map entries 232. In FIG. 2A, the fabric control plane 212 configures the map entries 232 as a policy during provisioning of the border node $B_1$ 214-1. In FIGS. 2B and 2C, the fabric control plane 212 adds and/or updates the map entries 232 when the border nodes 214 register or de-register with the fabric control plane 212. In some embodiments, the updates are not limited to registration or de-registration of border nodes, path property, path character, and/or path status (e.g., weight, cost, path congested, packet loss, packet delay, etc.) changes are also included in the map entries 232 maintained by the fabric control plane 212. Further, the fabric control plane 212 distributes the updated map entries 232 in the map cache 230 to interested nodes (e.g., the xTR 216). Upon receiving the updated map entries, the xTR 216 updates the map entries 232 in its map cache 217, e.g., adding an entry as shown in FIG. 2B, marking a border node as having reachability issues as shown in FIG. 2C, or updating the characteristics (e.g., cost/path characteristics) of the RLOCs (not shown), etc. Using the up-to-date information stored in the map cache 217, the xTR 216 connected to the source (e.g., the UE 201) can choose among these border nodes adjacent different sites based on the characteristics of the border nodes.

In some embodiments, as represented by block 660, selecting the second node from the updated map entries includes selecting the second node in response to receiving the one or more updates indicating path character changes (including a reachability issue, e.g., VN up or down, border node registration or de-registration, path property changes, e.g., weight, cost, and/or path status changes, e.g., congestion, packet loss and/or delay, etc.) to the external endpoint via the first node. In other words, the multi-site enterprise fabric can switch to a different border node in a different virtual network when a border node in the connection has reachability issues. In some other embodiments, as represented by block 662, selecting the second node from the updated map entries includes selecting the second node based at least in part on a policy and characteristics of the first node to the external endpoint. In other words, the multi-site enterprise fabric can re-distribute loads among the border nodes adjacent different sites for load balancing purposes, e.g., switching to a different border node or splitting a flow via one border node to multiple flows via multiple border nodes.

Though not shown in FIG. 6, in some embodiments, the multi-site fabric uses Locator/ID Separation Protocol (LISP) as overlay. In such embodiments, the source is assigned a first endpoint identifier, and the external endpoint is assigned a second endpoint identifier. Further in such embodiments, each of the sites are configured as a virtual network (VN) with Virtual Routing and Forwarding (VRF) and bound to an instance identifier (IID), and the location identifiers of the border nodes adjacent the sites are routing locators (RLOCs) of the border nodes. Additionally, in such embodiments, the map entries are shared across the sites in the multi-site enterprise fabric.

For example, in FIG. 2A, the UE 201 is assigned the endpoint identifier $EID_1$, and the server 202 in the external network 205 is assigned the endpoint identifier $EID_2$. Further, the site 220-1 via $ISP_1$ is configured as $VN_1$ with $VRF_1$ and bound to $IID_1$. Additionally, the border node $B_1$ 214-1 adjacent the site 220-1 for routing and forwarding packets through the site 220-1 is assigned a location identifier $RLOC_1$ to identify its location in the network topology.

In another example, in FIG. 1, the site 150-2 via $ISP_2$ is configured as $VN_2$ with $VRF_2$ and bound to $IID_2$. Further, the border node 160-2 adjacent the sites 140-N and 150-2 for routing and forwarding packets is assigned a location identifier $RLOC_2$ to identify its location in the network topology. The fabric control plane 142 maintains the LISP mapping in the map cache, where the LISP mapping includes RLOC and IID tuples for endpoint devices, e.g., $RLOC_1:IID_1$ for $EID_2$ and $RLOC_2:IID_2$ for $EID_2$ in FIG. 1. In FIG. 1, the fabric control plane 142 shares the LISP mapping information in the multi-site enterprise fabric, e.g., through Extranet or LISP VRF Leaking to share the LISP mapping information among $C_1$ 142-1, $C_X$ 142-x, and $C_N$ 142-N, etc.

When using LISP as overlay, in some embodiments, obtaining the map entries from the fabric control plane includes sending a first message to the fabric control plane of the multi-site enterprise fabric, where the first message includes the second endpoint identifier of the external endpoint, and receiving a second message including the map entries from the fabric control plane. In such embodiments, the second message is generated in accordance with the fabric control plane receiving one or more LISP map register messages from the one or more of the border nodes in accordance with some embodiments. In some other embodiments, the second message is a LISP map notify message.

For instance, in FIG. 1, the fabric edge device 115 requests LISP mapping information from the fabric control plane 142-1. In response, the fabric control plane 142-1 retrieves LISP mapping information from its map cache and sends to the fabric edge device 115, e.g., sending a LISP map reply message with a sample format shown in FIG. 3. In some embodiments, as shown in FIG. 2B, when the fabric control plane 212 receives the registration of the border node $B_2$ 214-2, e.g., using a LISP map register message with a sample format shown in FIG. 4, the fabric control plane 212 updates its map cache 230. Further, the fabric control plane 212 generates a notification (e.g., using a LISP map notify message with a sample format shown in FIG. 5) to the xTR 216, so that the xTR 216 can update its map cache 217 accordingly.

Figure 7:
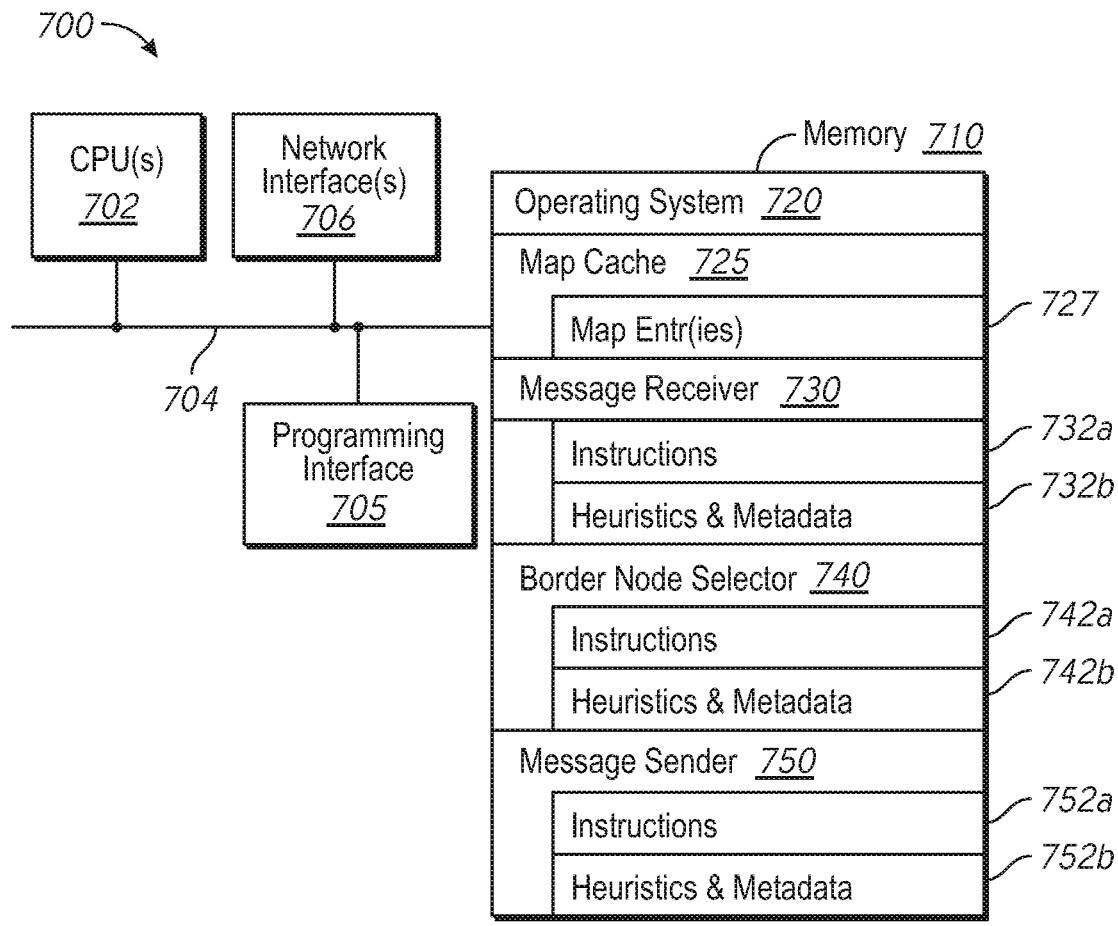
FIG. 7 is a block diagram of a networking device in accordance with some embodiments.

FIG. 7 is a block diagram of a networking device 700 in accordance with some embodiments. In some embodiments, the networking device 700 corresponds to the fabric edge device 115 (FIG. 1) or the xTR 216 (FIGS. 2A-2C), and performs one or more of the functionalities described above. In some embodiments, one or more of the functionalities performed by the networking device 700 can also be performed on the border nodes 145 and 160 (FIG. 1), the fabric control plane 142 (FIG. 1), the fabric control plane 212 (FIGS. 2A-2C), or the border nodes 214 (FIGS. 2A-2C). As such, the networking device 700 can also correspond to the border nodes 145 and 160 (FIG. 1), the fabric control plane 142 (FIG. 1), the fabric control plane 212 (FIGS. 2A-2C), or the border nodes 214 (FIGS. 2A-2C).

While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the networking device 700 includes one or more processing units (CPUs) 702 (e.g., processors), one or more network interfaces 706, a memory 710, a programming interface 705, and one or more communication buses 704 for interconnecting these and various other components.

In some embodiments, the one or more communication buses 704 include circuitry that interconnects and controls communications between system components. The memory 710 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 710 optionally includes one or more storage devices remotely located from the one or more CPUs 702. The memory 710 comprises a non-transitory computer readable storage medium. Moreover, in some embodiments, the memory 710 or the non-transitory computer readable storage medium of the memory 710 stores the following programs, modules and data structures, or a subset thereof including an optional operating system 720, a map cache 725 for storing one or more map entries 727 (e.g., the map cache 230 and/or the map cache 217 in FIGS. 2A-2C), a message receiver 730, a border node selector 740, and a message sender 750. In some embodiments, one or more instructions are included in a combination of logic and non-transitory memory. The operating system 720 includes procedures for handling various basic system services and for performing hardware dependent tasks.

In some embodiments, the message receiver 730 is configured to receive a message over the one or more network interfaces 706, e.g., receiving a border registration message, a request message, a notification message, a reply message as shown in FIGS. 1 and 2A-2C. To that end, the message receiver 730 includes a set of instructions 732a and heuristics and data 732b.

In some embodiments, the border node selector 740 (e.g., part of the fabric edge device 115 (FIG. 1), the xTR 216 (FIGS. 2A-2B), the border nodes 145 and/or 160 (FIG. 1), the fabric control plane 142 (FIG. 1), the fabric control plane 212 (FIGS. 2A-2C), or the border nodes 214 (FIGS. 2A-2C)) is configured to select a border node based on information derived from the messages received through the message receiver 730 and/or stored in the map cache 725 (e.g., the one or more map entries 727). To that end, the border node selector 740 includes a set of instructions 742a and heuristics and data 742b.

In some embodiments, the message sender 750 is configured to transmit a message over the one or more network interfaces 706, e.g., sending a border registration message, a request message, a notification message, a reply message as shown in FIGS. 1 and 2A-2C. To that end, the message sender 750 includes a set of instructions 752a and heuristics and data 752b.

Although the message receiver 730, the border node selector 740, and the message sender 750 are illustrated as residing on a single networking device 700, it should be understood that in other embodiments, any combination of the message receiver 730, the border node selector 740, and the message sender 750 are illustrated as residing on a single networking device 700 can reside in separate computing devices in various embodiments. For example, in some embodiments, each of the message receiver 730, the border node selector 740, and the message sender 750 illustrated as residing on a single networking device 700 resides on a separate computing device.

Moreover, FIG. 7 is intended more as a functional description of the various features that are present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first", "second", etc. can be used herein to describe various elements, these elements should not be limited by these terms.

These terms are only used to distinguish one element from another. For example, a first xTR/RLOC/border node could be termed a second xTR/RLOC/border node, and, similarly, a second xTR/RLOC/border node could be termed a first xTR/RLOC/border node, which changing the meaning of the description, so long as all occurrences of the "first xTR/RLOC/border node" are renamed consistently and all occurrences of the "second xTR/RLOC/border node" are renamed consistently. The first xTR/RLOC/border node and the second xTR/RLOC/border node are both xTRs/RLOCs/border nodes, but they are not the same xTR/RLOC/border node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method comprising:
   at a node in a multi-site enterprise fabric, the node includes one or more processors and a non-transitory memory:
   obtaining map entries from a fabric control plane of the multi-site enterprise fabric, wherein the map entries are associated with identifiers of endpoints in external networks, site and virtual network identifiers of sites in the multi-site enterprise fabric, location identifiers of border nodes adjacent the sites, and characteristics of the border nodes wherein the multi-site enterprise fabric uses Locator/ID Separation Protocol (LISP) as overlay wherein obtaining the map entries from the fabric control plane includes:
   sending a first message to the fabric control plane of the multi-site enterprise fabric, wherein the first message includes a second endpoint identifier of an external endpoint, and
   receiving a second message including the map entries from the fabric control plane;
   receiving a request from a source to connect to the external endpoint;
   deriving an identifier of the external endpoint and parameters associated with the source from the request; and
   facilitating establishing at least one connection between the source and the external endpoint via one or more border nodes, wherein the one or more border nodes are selected from the map entries based at least in part on the parameters associated with the source, the identifier of the external endpoint, and characteristics of the one or more border nodes along the at least one connection to the external endpoint.

2. The method of claim 1, wherein the map entries include:
   a first entry associated with the external endpoint, wherein the first entry represents an association of a first border node adjacent a first site with the first site and a cost of the first border node to the external endpoint through the first site; and
   a second entry associated with the external endpoint, different from the first entry, wherein the second entry represents an association of a second border node adjacent a second site with the second site and a cost of the second border node to the external endpoint through the second site.

3. The method of claim 1, wherein the characteristics of the border nodes include at least one of costs of the border nodes to the external endpoints, weights associated with the border nodes to the external endpoint, or priorities associated with the border nodes.

4. The method of claim 1, wherein the parameters associated with the source include at least one of a privilege, at least one identifier, a group, a Quality of Service (QoS) classification, or an identifier of a flow associated with the source.

5. The method of claim 1, further comprising:
   receiving one or more updates of the one or more border nodes from the fabric control plane; and
   updating the map entries based on the one or more updates to generate updated map entries, including updating the characteristics of the one or more border nodes.

6. The method of claim 5, further comprising:
   storing the map entries in a map cache; and
   updating the map entries in the map cache based on the one or more updates.

7. The method of claim 5, wherein the one or more updates are generated based on configurations of the border nodes during provisioning.

8. The method of claim 5, wherein the one or more updates are generated in accordance with the fabric control plane receiving updates from at least one border node of the border nodes.

9. The method of claim 5, wherein:
   the at least one connection between the source and the external endpoint includes a first node; and
   the method further includes:
   selecting a second node from the updated map entries; and
   modifying the at least one connection between the source to the external endpoint to include the second node.

10. The method of claim 9, wherein selecting the second node from the updated map entries includes selecting the second node in response to receiving the one or more updates indicating path character changes to the external endpoint via the first node.

11. The method of claim 9, wherein selecting the second node from the updated map entries includes selecting the second node based at least in part on a policy and characteristics of the first node to the external endpoint.

12. The method of claim 1, wherein the source is assigned a first endpoint identifier, and the external endpoint is assigned the second endpoint identifier.

13. The method of claim 1, wherein each of the sites are configured as a virtual network (VN) with Virtual Routing and Forwarding (VRF) and bound to an instance identifier (IID), and the location identifiers of the border nodes adjacent the sites are routing locators (RLOCs) of the border nodes.

14. The method of claim 1, wherein the map entries are shared across the sites in the multi-site enterprise fabric.

15. The method of claim 1, wherein the second message is generated in accordance with the fabric control plane receiving one or more LISP map register messages from the one or more of the border nodes.

16. The method of claim 1, wherein the second message is a LISP map notify message.

17. A node in a multi-site enterprise fabric comprising:
one or more processors;
a non-transitory memory coupled to the one or more processors; and
one or more programs stored in the non-transitory memory, which, when executed by the one or more processors, cause the one or more processors to:
obtain map entries from a fabric control plane of the multi-site enterprise fabric, wherein the map entries are associated with identifiers of endpoints in external networks, site and virtual network identifiers of sites in the multi-site enterprise fabric, location identifiers of border nodes adjacent the sites, and characteristics of the border nodes wherein the multi-site enterprise fabric uses Locator/ID Separation Protocol (LISP) as overlay wherein obtaining the map entries from the fabric control plane includes the one or more programs to cause the one or more processors to:
send a first message to the fabric control plane of the multi-site enterprise fabric, wherein the first message includes a second endpoint identifier of an external endpoint, and
receive a second message including the map entries from the fabric control plane;
receive a request from a source to connect to the external endpoint;
derive an identifier of the external endpoint and parameters associated with the source from the request; and
facilitate establishing at least one connection between the source and the external endpoint via one or more border nodes, wherein the one or more border nodes are selected from the map entries based at least in part on the parameters associated with the source, the identifier of the external endpoint, and characteristics of the one or more border nodes along the at least one connection to the external endpoint.

18. A non-transitory computer-readable medium encoding instructions, which, when executed by a processor of a networking device in a multi-site enterprise fabric, cause the networking device to:
obtain map entries from a fabric control plane of the multi-site enterprise fabric, wherein the map entries are associated with identifiers of endpoints in external networks, site and virtual network identifiers of sites in the multi-site enterprise fabric, location identifiers of border nodes adjacent the sites, and characteristics of the border nodes wherein the multi-site enterprise fabric uses Locator/ID Separation Protocol (LISP) as overlay wherein obtaining the map entries from the fabric control plane includes the computer-readable medium encoding instructions to cause the networking device to:
send a first message to the fabric control plane of the multi-site enterprise fabric, wherein the first message includes a second endpoint identifier of an external endpoint, and
receive a second message including the map entries from the fabric control plane;
receive a request from a source to connect to the external endpoint;
derive an identifier of the external endpoint and parameters associated with the source from the request; and
facilitate establishing at least one connection between the source and the external endpoint via one or more border nodes, wherein the one or more border nodes are selected from the map entries based at least in part on the parameters associated with the source, the identifier of the external endpoint, and characteristics of the one or more border nodes along the at least one connection to the external endpoint.

* * * * *